(12) United States Patent
Ording et al.

(10) Patent No.: US 7,114,785 B2
(45) Date of Patent: Oct. 3, 2006

(54) AERODYNAMIC SURFACED BICYCLE WHEEL

(75) Inventors: Andrew Ording, Carmel, IN (US); Joshua R. Poertner, Brentwood, TN (US)

(73) Assignee: Compositech, INC, Speedway, IN (US)

( * ) Notice: Subject to any disclaimer, the term of this patent is extended or adjusted under 35 U.S.C. 154(b) by 0 days.

(21) Appl. No.: 10/679,176

(22) Filed: Oct. 3, 2003

(65) Prior Publication Data

US 2004/0135424 A1    Jul. 15, 2004

Related U.S. Application Data

(60) Provisional application No. 60/416,107, filed on Oct. 4, 2002.

(51) Int. Cl.
*B60B 3/10* (2006.01)
*B60B 5/02* (2006.01)
*B64C 1/38* (2006.01)
*B62D 35/00* (2006.01)

(52) U.S. Cl. .......................... 301/63.106; 301/64.703; 244/130; 296/181.5

(58) Field of Classification Search .......... 301/63.106, 301/37.41, 37.105, 64.301, 64.302, 64.305, 301/64.706; 244/130; 296/181.5
See application file for complete search history.

(56) References Cited

U.S. PATENT DOCUMENTS

| | | | |
|---|---|---|---|
| 697,118 A | 4/1902 | Van Horn | |
| 810,860 A | 1/1906 | Heart | |
| 1,420,097 A * | 6/1922 | Harvey | 301/63.108 |
| 1,447,927 A * | 3/1923 | Crawford | 301/63.108 |
| 1,968,005 A | 7/1934 | Swain | 188/18 |
| 1,969,088 A | 8/1934 | Maranville | 152/13 |
| 3,452,798 A | 7/1969 | Ravreby | 152/323 |
| 3,656,531 A | 4/1972 | Ross et al. | 152/8 |
| 3,732,951 A | 5/1973 | Hata et al. | 188/24 |
| 3,862,779 A | 1/1975 | Jayne | 301/63 |
| 4,280,736 A | 7/1981 | Raudman | 301/6 |
| 4,284,302 A * | 8/1981 | Drews | 296/181.5 |
| 4,508,392 A | 4/1985 | LeBlond et al. | 301/63 |
| 4,620,749 A * | 11/1986 | McEachern | 301/37.41 |
| 4,639,046 A | 1/1987 | Oleff et al. | 301/63 |
| 4,660,893 A * | 4/1987 | Huntzinger | 301/37.41 |
| 4,732,428 A | 3/1988 | Monte | 301/63 |
| 4,793,659 A | 12/1988 | Oleff et al. | 301/63 PW |
| 4,835,857 A | 6/1989 | Michelotti | 29/159 R |
| 4,844,552 A | 7/1989 | Tsygankov et al. | 301/63 |
| 4,919,490 A | 4/1990 | Hopkins et al. | 301/63 |

(Continued)

FOREIGN PATENT DOCUMENTS

DE    30 16 862    11/1981

(Continued)

OTHER PUBLICATIONS

Specialized Bicycle Components Accessory Catalog, 1990.

(Continued)

*Primary Examiner*—Jason R. Bellinger
(74) *Attorney, Agent, or Firm*—E. Victor Indiano; Indiano Vaughan, LLP

(57) ABSTRACT

A bicycle wheel includes a tire engaging portion located at the outward perimeter of the wheel, an inner portion located radially inward from the tire engaging portion A pair of air engaging side surfaces extend radially between the inner portion and the tire engaging portion forming the sides of the wheel. The air engaging side surfaces contain a plurality of surface features designed to create a turbulent boundary layer when the wheel travels through air to reduce aerodynamic drag on the wheel.

23 Claims, 14 Drawing Sheets

U.S. PATENT DOCUMENTS

| | | | | |
|---|---|---|---|---|
| 4,995,675 A | | 2/1991 | Tsai | 301/63 |
| 5,061,013 A | | 10/1991 | Hed et al. | 301/63 |
| 5,064,250 A | | 11/1991 | Yashiro et al. | 301/54 |
| 5,080,444 A | | 1/1992 | Hopkins et al. | 301/97 |
| 5,104,199 A | | 4/1992 | Schlanger | 301/63 |
| 5,171,623 A | * | 12/1992 | Yee | 428/156 |
| 5,246,275 A | | 9/1993 | Arredondo, Jr. | 301/64.7 |
| 5,249,846 A | | 10/1993 | Martin et al. | 301/64.7 |
| 5,378,524 A | * | 1/1995 | Blood | 428/141 |
| 5,415,463 A | | 5/1995 | Olson et al. | 301/64.7 |
| 5,490,719 A | | 2/1996 | Lew | 301/5.1 |
| 5,540,485 A | | 7/1996 | Enders | 301/104 |
| 5,564,793 A | | 10/1996 | Whiteford | 301/64.1 |
| 5,603,553 A | * | 2/1997 | Klieber et al. | 301/37.41 |
| 5,848,769 A | * | 12/1998 | Fronek et al. | 244/200 |
| 5,975,645 A | | 11/1999 | Sargent | 301/95 |

FOREIGN PATENT DOCUMENTS

| | | |
|---|---|---|
| FR | 2702707 | 9/1994 |
| WO | 93/09963 | 5/1993 |

OTHER PUBLICATIONS

Proven Performance, Hed Design, 1989 Product Price List.
ZIPP Catalog Sheets, Compositech, Inc., circa late 1980s to early 1990s.
Triathlete Magazine, Jun. 1990, p. 19.
AEROSPOKE advertising brochure (2 pages), circa late 1980s to early 1990s.
ZIPP Competition 2001 Catalog, Compositech, Inc.
Titleist.com, Principles of Aerodynamics by Steve Aoyama (14 pages), Jul. 2002 or earlier.

* cited by examiner

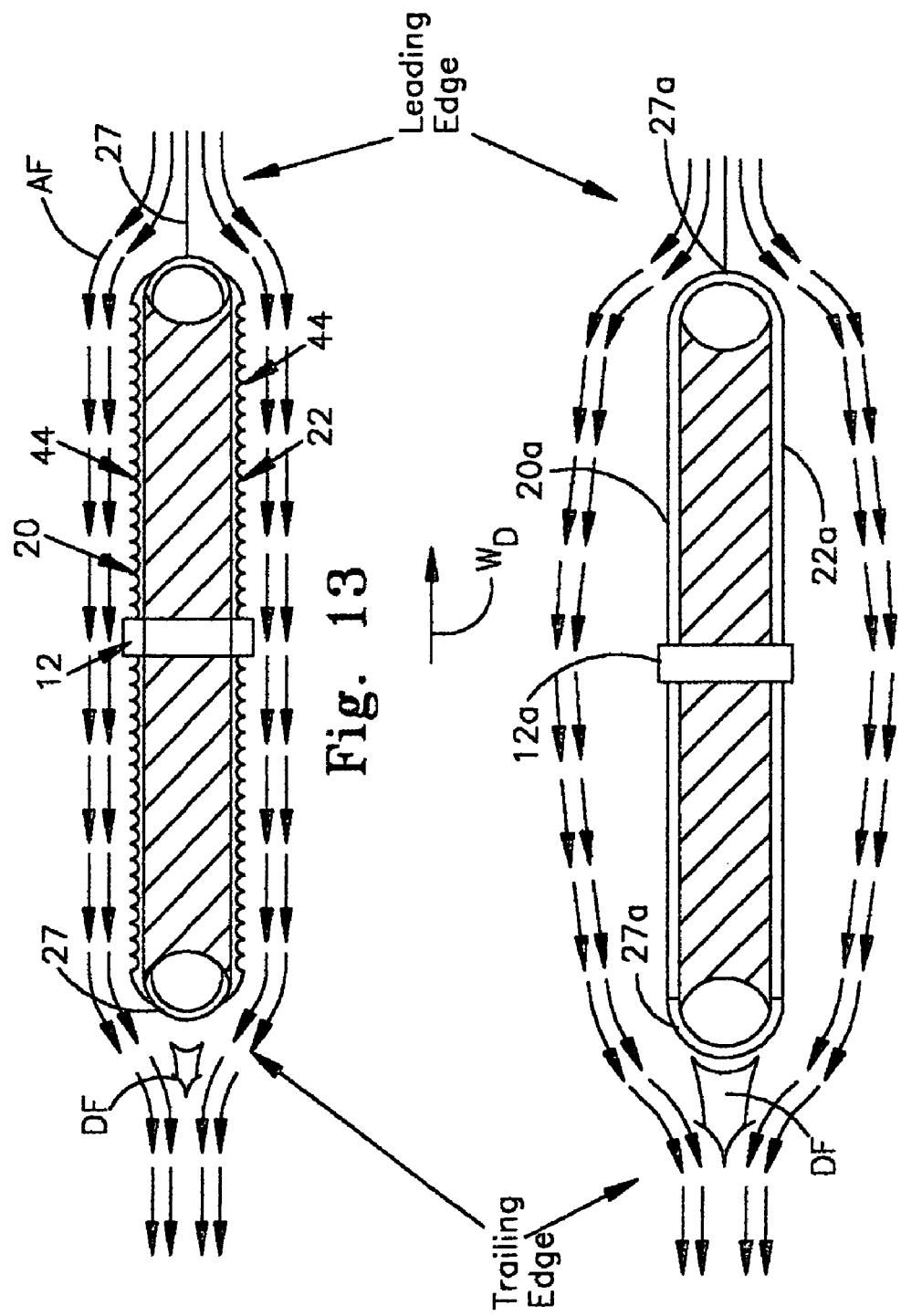

AERODYNAMIC SURFACED BICYCLE WHEEL

REFERENCE TO RELATED APPLICATIONS

This Application claims the benefit of Ording and Poertner U.S. Provisional Application No. 60/416,107, filed 04 Oct. 2002. and is co-pending with Ording and Poertner PCT Application Ser. No. PCT/US03/31669 filed concurrently herewith on 03 Oct. 2003.

I. TECHNICAL FIELD OF THE INVENTION

The present invention relates to a wheel, and more particularly to a bicycle wheel having an aerodynamically enhanced surface.

II. BACKGROUND OF THE INVENTION

The technology underlying the design of bicycle wheels has evolved in recent years. For many years, sturdiness and ease of manufacture were the primary driving forces underlying the design of a bicycle wheel. However, increasingly, bicycle wheels, and especially bicycle wheels designed for racing purposes, are being designed to be light-weight and aerodynamically efficient.

A variety of techniques have been used to achieve lighter weights, with most of the design efforts being centered in the choice of materials from which the bicycle wheel is made. Traditionally, bicycle wheels were made from a steel extrusion bent into a circular hoop. However, in order to make the wheels more light-weight, lighter weight metals, such as aluminum, and exotic metals such as titanium and other alloys have been substituted for steel. Additionally, significant weight savings can be achieved through the use of strong, light weight non-metallic materials, such as carbon fiber composite materials. Examples of such carbon fiber wheels are the wheels produced by Compositech, Inc. of Speedway, Ind. under its ZIPP® Speed Weaponry® brand.

Another technology improvement that has come to the fore in recent years is to shape the wheels in a manner that increases aerodynamic efficiency. To achieve this result, a wide variety of different wheel shapes have been produced. The object of most of these designs is to better control the flow of air over the wheel to reduce the aerodynamic drag of the wheel.

One example of such an aerodynamic wheel is the disc-type bicycle wheel. A disc wheel is unlike a traditional wheel in that it has no spokes. Rather, the disc wheel typically has a center hub for mounting the wheel to a bicycle frame, a radially outwardly facing tire engaging portion, and first and second opposed, radially extending, axially facing side surfaces. The side surfaces are disc-shaped, have no significant open spaces, and extend between the hub and the tire engaging surface. On a disc wheel, the side surfaces are generally continuous, to leave no voids between the hub and tire engaging surface. An example of such a disc wheel is the ZIPP® 900 Disc Wheel, manufactured by Compositech, Inc. Disc wheels have been found to be especially useful on bikes used on racing tracks and events where riders ride against the clock, as their light weight and aerodynamic efficiency, help to increase a riders' ability to achieve and maintain high speeds.

Another technique for increasing aerodynamic efficiency is to increase the radial extent of the side surfaces of a rim-and-spoke type wheel, to produce a "deep section" type wheel. As a point of comparison, a typical bicycle rim of a rim-and-spoke type wheel has a side surface with a radial extent of approximately one half inch or less. In most cases, the radial extent of the rim is only slightly larger than the radial extent of typical caliper of a bicycle brake pad. By contrast, a deep section type rim may have a radial extent well over one inch, and often two inches or more. Examples of such deep section rims are the ZIPP® 404 rim, which is also manufactured by Compositech, Inc., and the rims shown in Sargent, U.S. Pat. No. 5,975,645; and Hed et al., U.S. Pat. No. 5,061,013. The theory behind the use of such deep section rims is that the increased radial extent of the side surface of the rim creates an airfoil shape which reduces the aerodynamic drag of the wheel.

A further technique for reducing aerodynamic drag of a bicycle wheel involves reducing the number of spokes on the bicycle wheel and making the spokes more aerodynamically shaped. Typically, racing wheels have significantly fewer spokes than non-racing wheels. By reducing the number of spokes, it is believed that the turbulence created by the wheel is reduced, thereby reducing the aerodynamic drag of the wheel.

Although the above-mentioned techniques and wheels do provide a significant improvement in aerodynamic efficiency, when compared to standard wheels, room for further improvement still exists. In particular, room for improvement exists in increasing the aerodynamic efficiency even further.

One object of the present invention is to provide a wheel with a more aerodynamically efficient surface to help further reduce drag, when compared to wheels of similar shape and weight.

III. SUMMARY OF THE INVENTION

In accordance with the present invention, a bicycle wheel includes a tire engaging portion located at the outward perimeter of the wheel, an inner portion located radially inward from the tire engaging portion, and a pair of air engaging side surfaces extending radially between the inner portion and the tire engaging portion forming the sides of the wheel. The air engaging side surfaces contain a plurality of surface features designed to create a turbulent boundary layer when the wheel travels through air to reduce aerodynamic drag on the wheel.

Drag is the air resistance that exerts itself in the direction opposite to the wheel's direction of movement, and thus the bicycle's direction of movement. As the wheel travels through the air, the air that surrounds the wheel has different velocities and thus, different pressures. The air exerts maximum pressure at a stagnation point on the front of the wheel. The air then flows around the side surfaces of the wheel with an increased velocity and reduced pressure. At some separation point, the air separates from the side surfaces of the wheel and generates a large turbulent flow area behind the wheel. This flow area, which is called the wake, has low pressure. The difference between the high pressure at the front of the wheel and the low pressure behind the wheel slows the wheel and the bicycle down. This is the primary source of drag for the bicycle wheel.

All objects moving through air have a thin layer, called the boundary layer, of air surrounding them. The object shapes range from blunt to streamlined. Blunt objects create large wakes behind them that in turn create greater drag. More streamlined objects create a smaller wake and therefore less drag. The surface features on the wheel cause a thin boundary layer of air adjacent to the wheel's outer surface to become turbulent. This turbulence energizes the boundary layer and helps keep it attached to the sides of the wheel longer, thus moving the separation point further backward on the wheel which reduces the size of the wake behind the wheel creating a more streamlined and aerodynamic air flow. As a result, there is a reduction in the area of the wake behind the wheel which increases the pressure behind the wheel, and substantially reduces the aerodynamic drag. It is the surface features on the wheel of the present invention that creates the turbulence in the boundary layer and reduces the aerodynamic drag.

In the preferred embodiment, the surface features include a series of depressions, for example dimple-shaped depressions. Multiple sized depressions are preferred in order to pack more depressions onto the surface of the wheel.

In one embodiment, the dimple-shaped depressions extend generally between the hub portion and the braking surface, but do not extend on to the braking surface. The dimpled depressions can comprise an array of uniformly sized dimpled depressions, or the dimpled depressions can comprise an array of various sized dimpled depressions, including a tightly spaced pattern of larger dimpled depressions intermingled with smaller dimpled depressions.

One feature of the present invention is that it includes, on its air engaging surface, an array of surface features such as dimple-shaped depressions. The dimple-shaped depressions provide two advantages, with the first being aerodynamic, and the second being structural. With respect to the aerodynamic advantages, the covering of dimples on the air engaging surface creates a thin layer of air next to the wheel, the boundary layer. This boundary layer of air becomes turbulent in its flow patterns over the surface features of the air engaging surfaces. Rather than flowing in smooth continuous layers over the air engaging surface, the dimples cause the air to have a microscopic pattern of fluctuations and randomized flow. This "turbulence" in the boundary layer enables the air flowing around the air engaging surface to better follow the surface of the air engaging surface, and enables the air to travel further along the air engaging surfaces of the wheel. This creates a much smaller wake at the "down stream end" of the wheel. This reduced wake results in a significant reduction in the aerodynamic drag of the wheel.

The use of surface depressions, such as an array of dimpled depressions or radially extending depressions, can also provides structural advantages to the wheel, especially a disc-type wheel. A disc-type wheel generally includes an air engaging surface that extends continuously between the hub at the center of the wheel, and a tire-engaging portion at the radially outward perimeter of the wheel. As such, the first and second air engaging surfaces in prior wheels comprise smooth circular planes having a diameter that is usually in a range of 26 or 27 inches. Although the carbon fiber composite material from which disc wheels such as the ZIPP® 900 Disc Wheel are made is very rigid, it will be appreciated that any large planar body, such as a disc wheel, upon which radially and axially directed forces are exerted, may be induced to flex or bow. An array of surface features placed on the air engaging surfaces which protrude into and/or extend out of the major plane of the air engaging surfaces of a wheel can increase the rigidity of the wheel, and enhance the resistance of the wheel to flexing movements.

These and other features will become apparent upon your review of the drawings and detailed description presented below that set forth the best mode of practicing the invention known presently to the Applicant.

IV. BRIEF DESCRIPTION OF DRAWINGS

FIG. 13 is a schematic sectional view of a wheel of the present invention moving through the air;

FIG. 14 is a schematic sectional view of a prior art wheel moving through the air;

V. DETAILED DESCRIPTION

Figure 1:
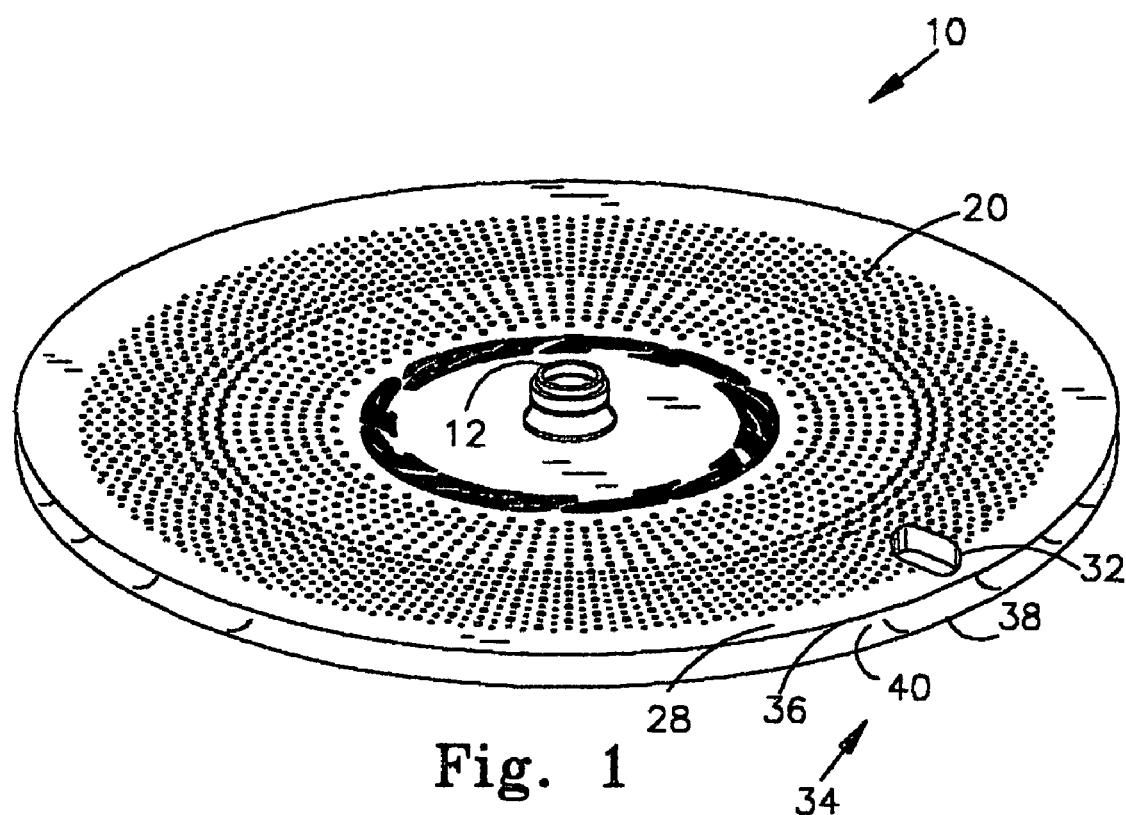
FIG. 1 is a perspective view of the wheel of the present invention.
Figure 2:
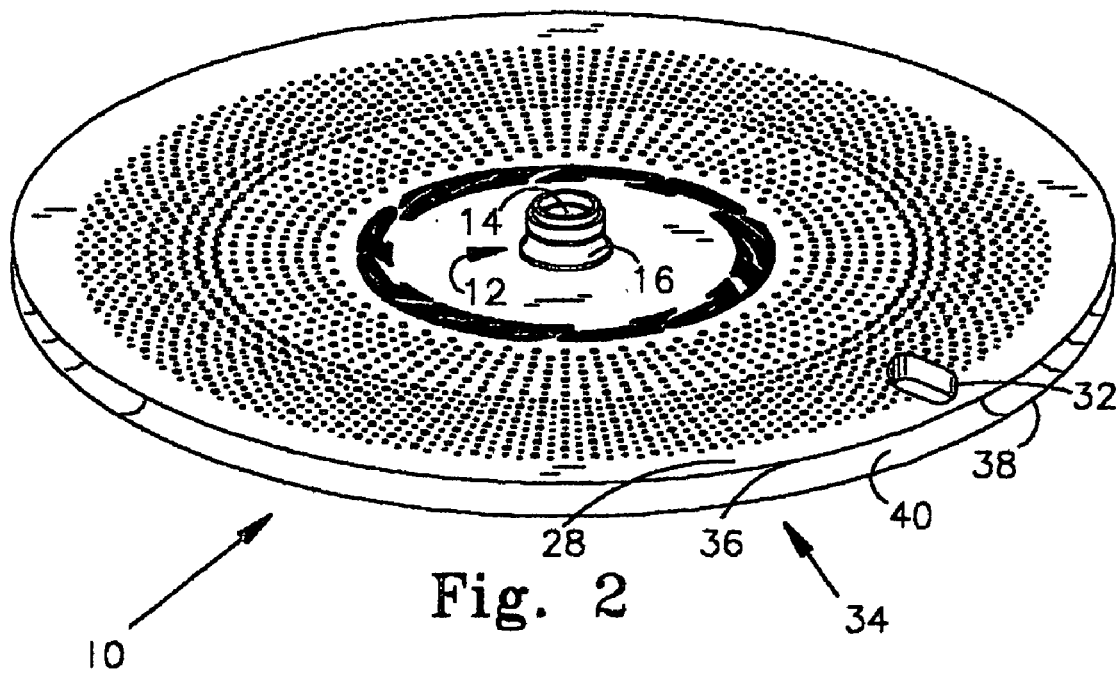
FIG. 2 is a second perspective view of the wheel of the present invention.
Figure 3:
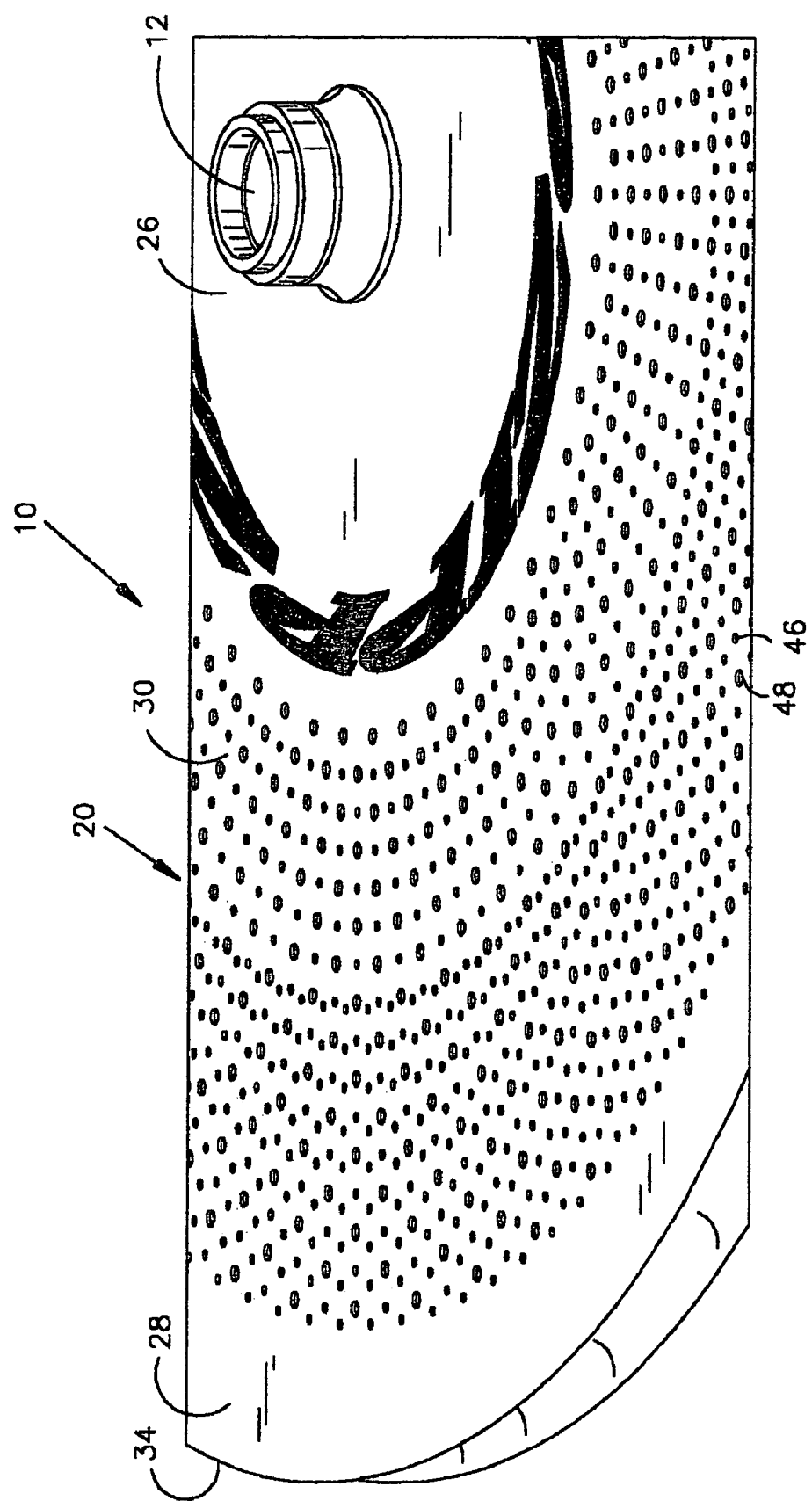
FIG. 3 is a relatively, closer-up, perspective view of a portion of the wheel of the present invention.
Figure 4:
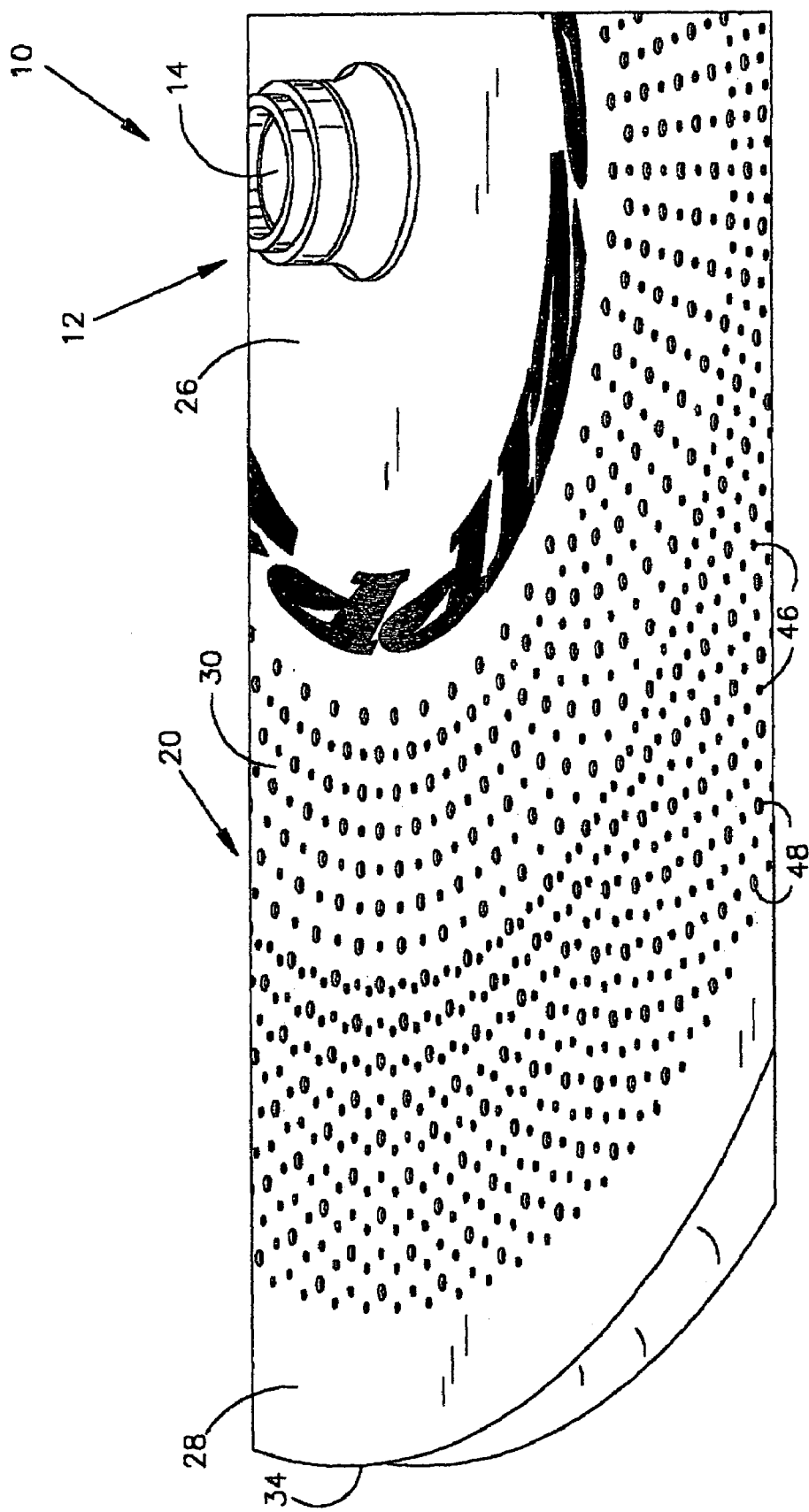
FIG. 4 is a second relatively, closer-up, perspective view of a portion of the wheel of the present invention.
Figure 5:
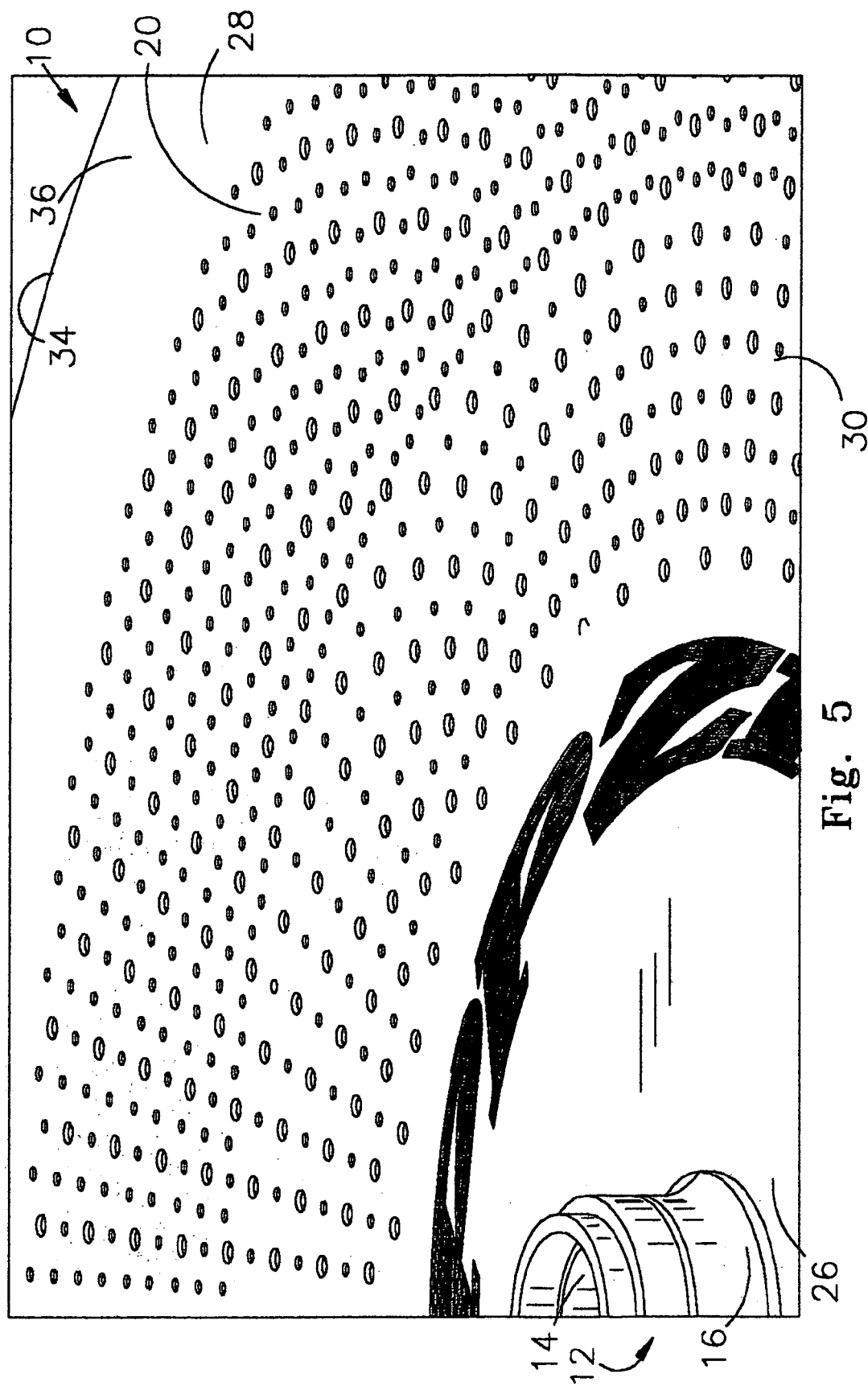
FIG. 5 is a third relatively, closer-up, perspective view of a portion of the wheel of the present invention.
Figure 6:
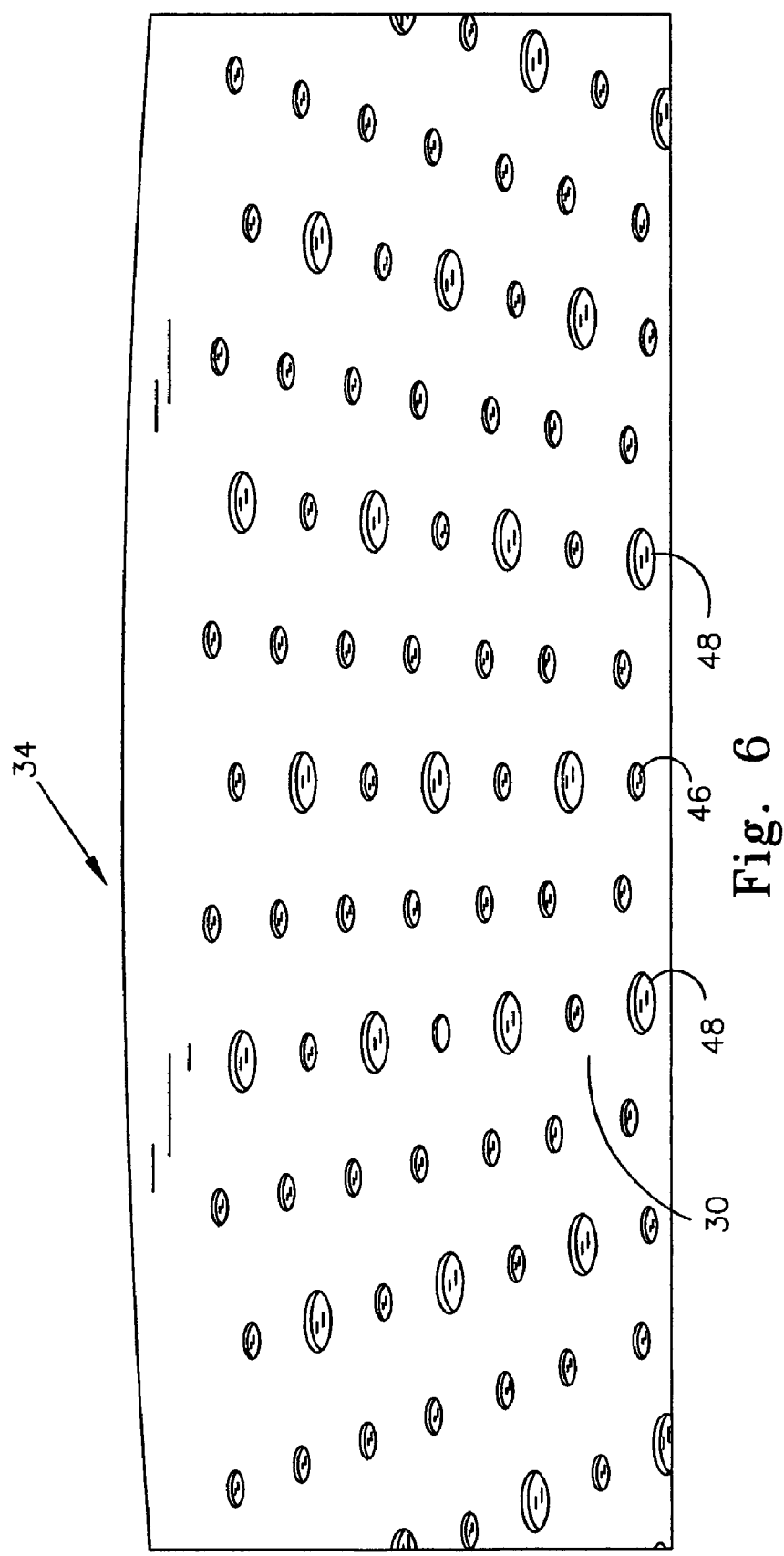
FIG. 6 is an extreme close-up perspective view of a portion of the wheel of the present invention.
Figure 7:
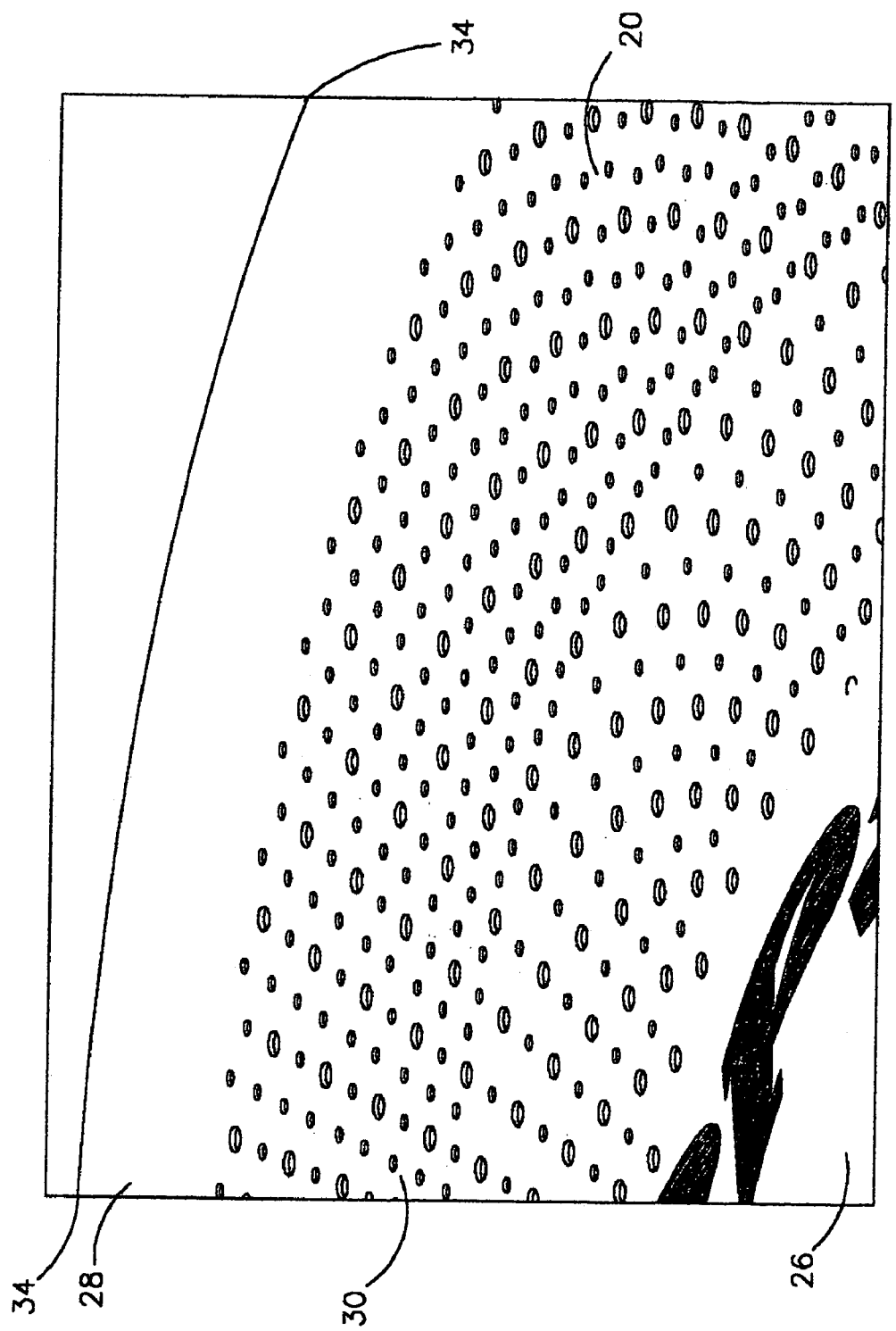
FIG. 7 is a second extreme close-up perspective view of a portion of the wheel of the present invention.

FIGS. 1–7 illustrate an embodiment of a disc type bicycle wheel 10 which is generally circular or disc-shaped, and includes a hub portion 26 with a hub 12 at its center, a tire engaging portion 34 at its radial perimeter, and first and second axially-opposed, air engaging surfaces 20, 22 extending from the hub portion 26 to the tire engaging portion 34.

The wheel 10 shown in the figures is composed primarily of a core that may either be hollow, filled with foam, or contain some foam and hollow spaces, such as in the honeycomb type core used by the Applicant. The core is overlain with a carbon fiber composite material which forms the first and second air engaging surfaces 20, 22. In this regard, the wheel 10 shown in FIGS. 1–7, has an exoskeletal structure where the carbon fiber skin provides a majority of the wheels' shape and structural strength, with the interior core, if any, being used for a filler material to aid in the manufacture of the carbon fiber wheel 10. Additionally, the core helps to distribute loads between and across the carbon fiber sides of the wheel 10. In many wheels, the hub 12 is a separately fabricated component that is not a part of the core and carbon fiber fabrication process. Rather, the hub 12 is coupled to the core and carbon fiber structure after its fabrication.

The hub 12 is disposed at the radial center of the wheel 10, and may be made from metal-based components, carbon fiber based components, or a mixture of metal and carbon fiber based components. An example of a hub which works well with the present invention is the ZIPP® Track/Cassette Hub available from Compositech, Inc. The hub 12 includes an axle portion 14 that is rotatable independently of the remainder of the hub 12, and a flange portion 16 that extends radially outward for a short distance to engage a portion of the carbon fiber hub portion 26 of the wheel 10.

The tire engaging surface 34 is disposed at the outward radial perimeter of the wheel 10. The tire engaging portion 34 is designed for receiving a tire 27 (FIGS. 11 and 12) that can be mounted thereto. The tire engaging portion 34 includes a first circumferential lip 36 disposed adjacent to the first air engaging surface 20 at the farthest radially outward extent thereof; and a second circumferential lip 38 disposed adjacent to the second air engaging surface 22. A radially outwardly facing, generally concavely disposed central tire facing portion 40 extends in a generally axial direction between the first and second circumferential lips 36, 38, and perimetrally around the wheel 10.

The first air engaging surface 20 is generally planar and forms the majority of the first side of the wheel 10 extending between the hub 12 and the tire engaging portion 34. The second air engaging surface 22 is generally planar and forms the majority of the second side of the wheel 10, which is axially opposed to the first side of the wheel 10, extending between the hub 12 and the tire engaging portion 34. The wheel 10 is generally symmetrical about a radially extending plane, so that the first and second side surfaces 20, 22 are generally mirror-images of each other. Although the wheel 10 shown in the drawings is shown as having planar sides 20, 22, the sides can be non-planar, such as the lens shaped sides contained on disc type wheels sold by other manufacturers. The first and second side surfaces 20, 22 are referred to herein as air engaging surfaces.

As those familiar with the manner in which a bicycle wheel operates during use on a bicycle, the front surface of the tire 27 mounted on the wheel 10 will be the leading surface to move through the air as the bicycle is moving. The air through which the tire 27 passes is "cut" by the tire 27, and flows around the first and second air engaging surfaces 20, 22 of the wheel 10 and comes back together near the rear surface of the tire 27. This air flow around the wheel 10 will be discussed in more detail below in connection with FIGS. 11 and 12.

In FIGS. 1–7, each of the first and second side surfaces 20, 22 includes the radially inwardly, positioned hub portion 26, a radially outwardly disposed washer-shaped brake engaging portion 28, and a surface feature containing middle portion 30. The hub portion 26 is disposed adjacent to the central hub 12 of the wheel 10. The hub portion 26 may or may not include surface features. The brake engaging portion 28 is washer-shaped and is disposed adjacent to the tire engaging portion 34 of the wheel 10.

The brake engaging portion 28 generally has a radial extent that is slightly larger than the height of a typical bicycle brake caliper. The brake engaging portion 28 may include a surface coating, or a dispersion within the carbon fiber to improve braking characteristics.

Figure 17:
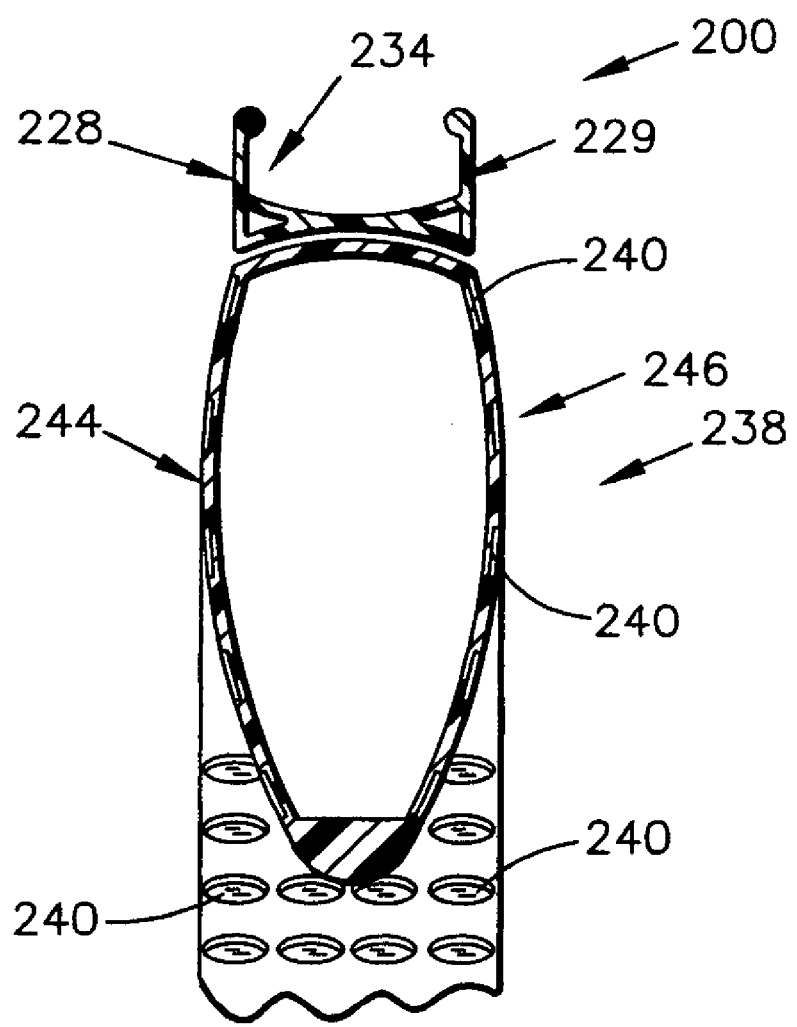
FIG. 17 is a sectional view of a clincher type rim embodying the present invention.

In FIGS. 1–7, the brake engaging portion 28 and the tire engaging portion 34 are shown to be made of carbon fiber, and formed integrally with the remainder of the first and second air engaging surfaces 20, 22. This integral construction works well with sew-up rims. Turning now to FIG. 17, a clincher type rim 200 similar to that shown in the Sargent '645 patent is shown which incorporates the teachings of the present invention. With "clincher" type rims of the type shown in the Sargent and Hed patents discussed above, the brake engaging surfaces 228, 229 and the tire engaging portion 234 are contained upon a hoop shaped component 236 that is fabricated separately from a body portion 238. The body portion 238 includes surface features 240, such as dimples on the air engaging first and second side surfaces 244, 246. The hoop shaped component serves as both the brake engaging surfaces 228, 229 and tire engaging portion 234 of the wheel 200 as illustrated in FIG. 17. The brake engaging surfaces 228, 229 and tire engaging portion 234 may be made from metal-based components, such as aluminum, carbon fiber based components, or a mixture of metal and carbon fiber based components. Returning back to FIGS. 1–7, an oval-shaped valve stem receiving aperture 32 extends partially, or fully through the wheel 10 and is designed for receiving a valve stem, to permit the user to inflate and deflate a tire 27 that is mounted on the wheel 10.

As best shown in FIGS. 1–5, the surface feature containing middle portion 30 of the wheel 10 is disposed radially outward of the hub portion 26, and radially inward of the brake engaging portion 28. The middle portion 30 comprises the majority of the surface area of each of the first and second air engaging surfaces 20, 22 of the wheel 10. As best shown in some of the close up drawings of the wheel, such as FIGS. 3–7, the surface feature containing middle portion 30 includes a field of surface features, which, on the embodiment shown in FIGS. 1–7, comprises a series of multi-sided polygonally-shaped, relatively shallow, relatively smaller, dimple-like depressions 46, interspersed with a series of multi-sided polygonally-shaped, relatively shallow, relatively larger, dimple-like depressions 48. The smaller depressions 46 and the larger depressions 48 are distributed among each other so that the dimple-like depressions comprise a large portion of the surface area of the middle portion 30 of each of the first and second air engaging side surfaces 20, 22 of the wheel 10. It will be noted that the surface features 46, 48 are recessed, relative to the major planes of the first and second side surfaces 20, 22 and that the surface features 46, 48 are generally shallow, generally disc-shaped, and include generally planar bottoms.

Figure 8:
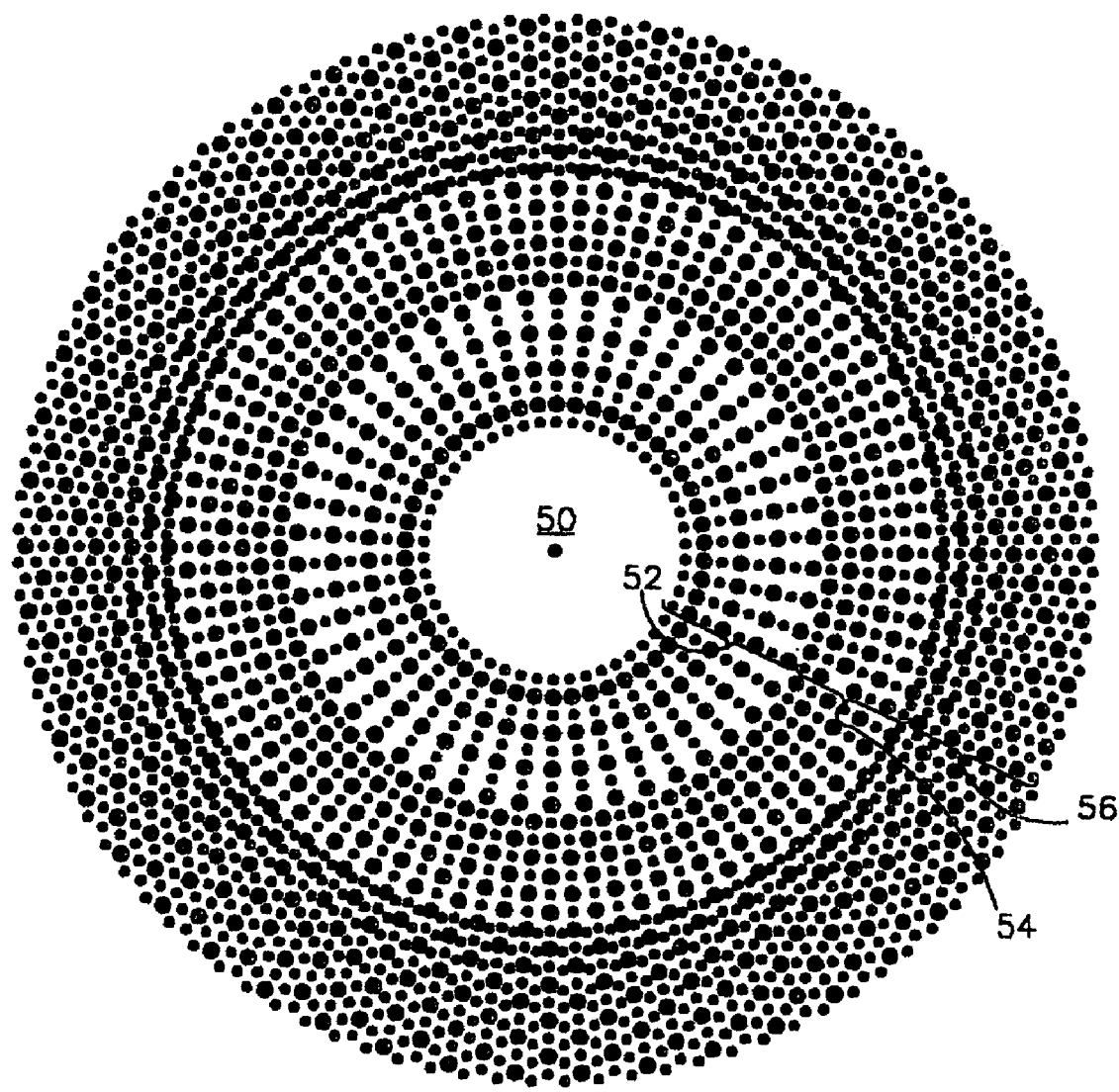
FIG. 8 is a diagram of a surface feature pattern for the air engaging side surfaces of the present invention.

In the preferred embodiment, the surface features include a series of icosahedral (20-sided) depressions with diameters in the range of 0.2–0.4 inches, and depths in the range of 0.003–0.005 inches. The preferred embodiment includes four different diameters of depressions in the aforementioned range in order to increase the density of surface features on the air engaging side surfaces of the wheel. FIG. 8 shows the preferred surface feature pattern for the air engaging side surfaces 20, 22 of the wheel 10. The surface feature pattern includes a central portion 50 located at the center of the wheel 10 in which the hub 12 would be located; an inner surface feature section 52 having a plurality of radially emanating rows of surface features, a central surface feature section 54 having additional radially emanating rows of surface features, and an outer surface feature section 56 having further radially emanating rows of surface features. The rows of surface features increase with the increasing diameter of the wheel from the center to the perimeter.

Figure 9:
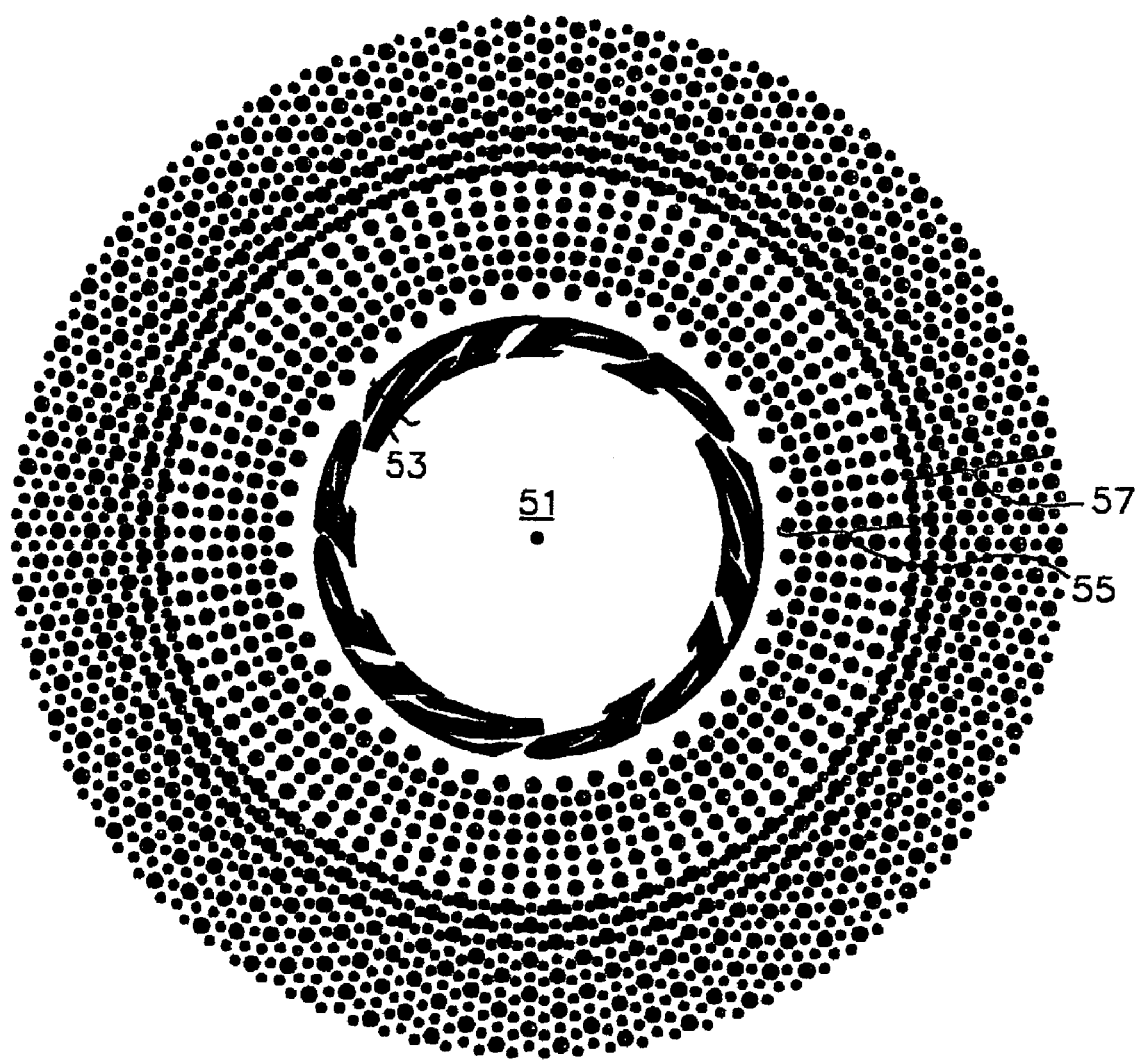
FIG. 9 is a diagram of a surface feature pattern with a mark for the air engaging side surfaces of the present invention.

FIG. 9 shows a surface feature pattern for the air engaging side surfaces 20, 22 of the wheel 10 that includes a textual mark. The surface feature pattern of FIG. 9 includes a central portion 51 located at the center of the wheel 10 in which the hub 12 would be located; an inner surface feature section 52 having a textual mark, a central surface feature section 54 having radially emanating rows of surface features, and an outer surface feature section 56 having additional radially emanating rows of surface features. As in FIG. 8. the rows of surface features increase with the increasing diameter of the wheel from the center to the perimeter.

In lieu of the shallow, generally disc-shaped depressions 46, 48 shown in the FIGS. 1–7, other shaped surface features can be employed. Such other shaped surface features can include, for example, circular-shapes, other multi-sided polygon shapes, such as hexagons or octagons, hemi-spherically concave depressions, hemi-spherically convex protrusions, or radially extending shapes. The surface features can also be designed in uniform patterns, or to appear random.

Figure 10:
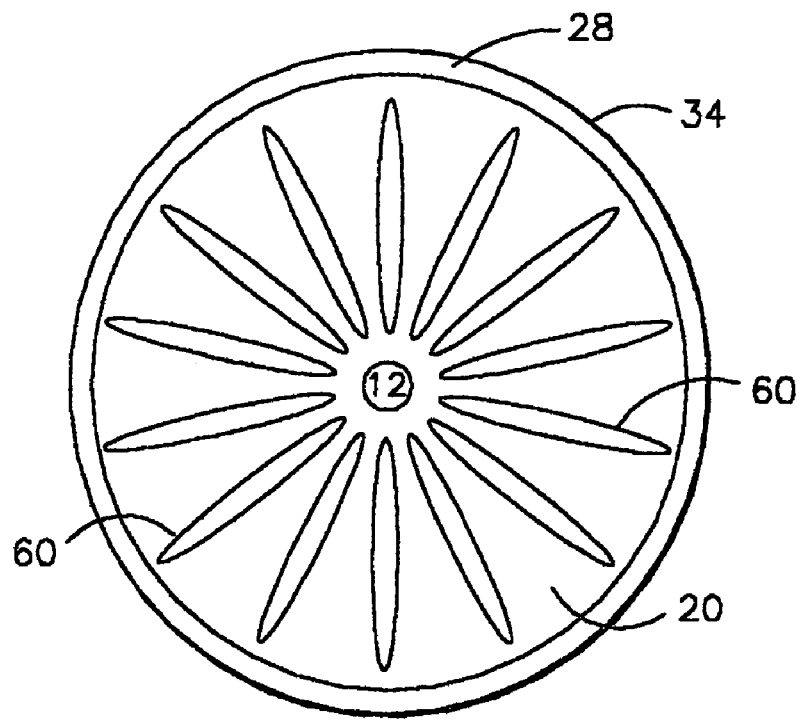
FIG. 10 is an illustrative drawing of a wheel of the present invention with radial surface features.
Figure 11:
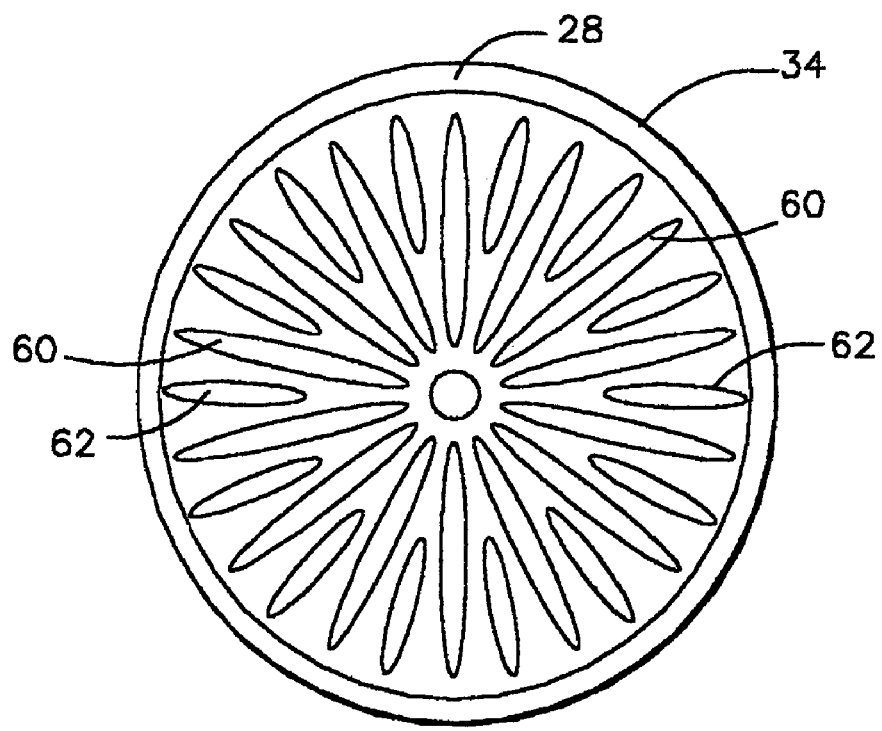
FIG. 11 is an illustrative drawing of a wheel of the present invention with multiple sized radial surface features.
Figure 12:
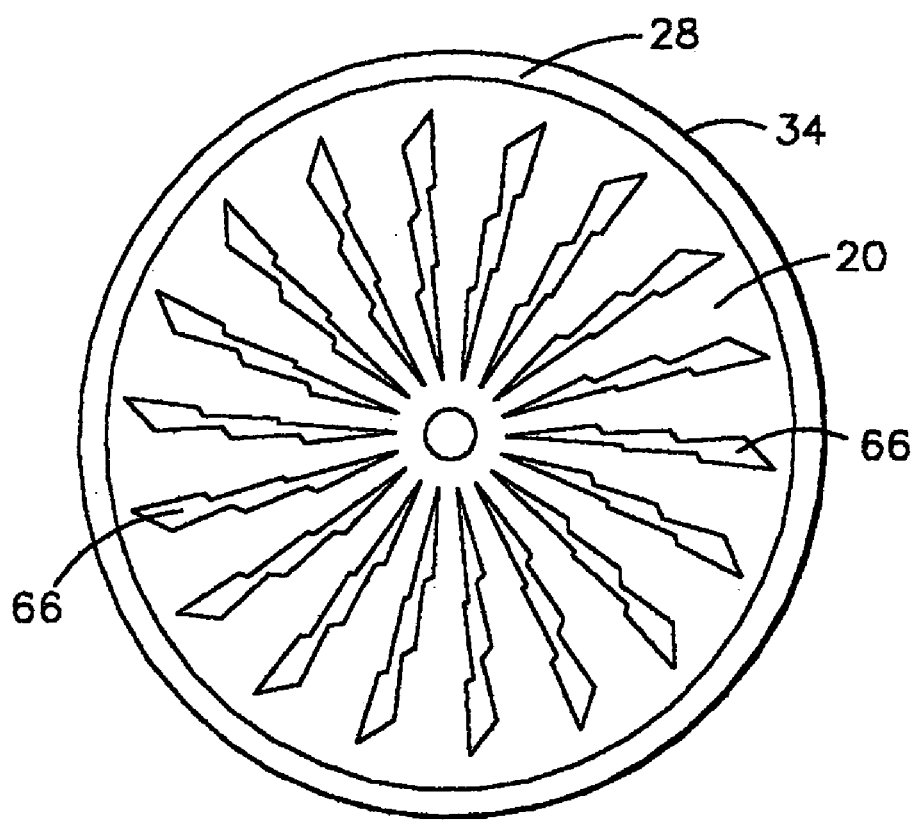
FIG. 12 is an illustrative drawing of a wheel of the present invention with zig-zag shaped surface features.
Figure 15:
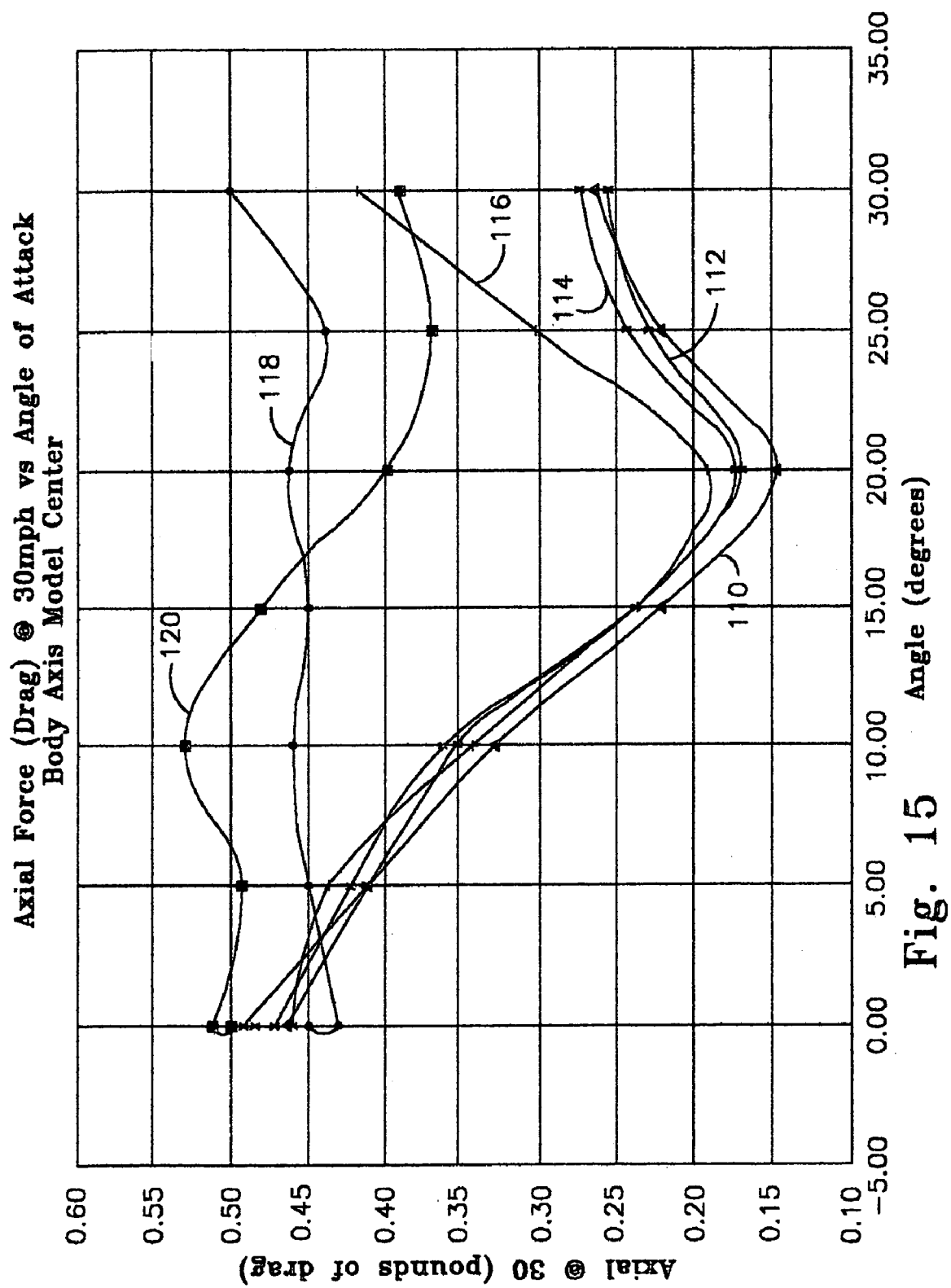
FIG. 15 is a graph showing the drag force at a speed of thirty miles per hour for a wheel of the present invention and several different prior art wheel types versus angle of attack.
Figure 16:
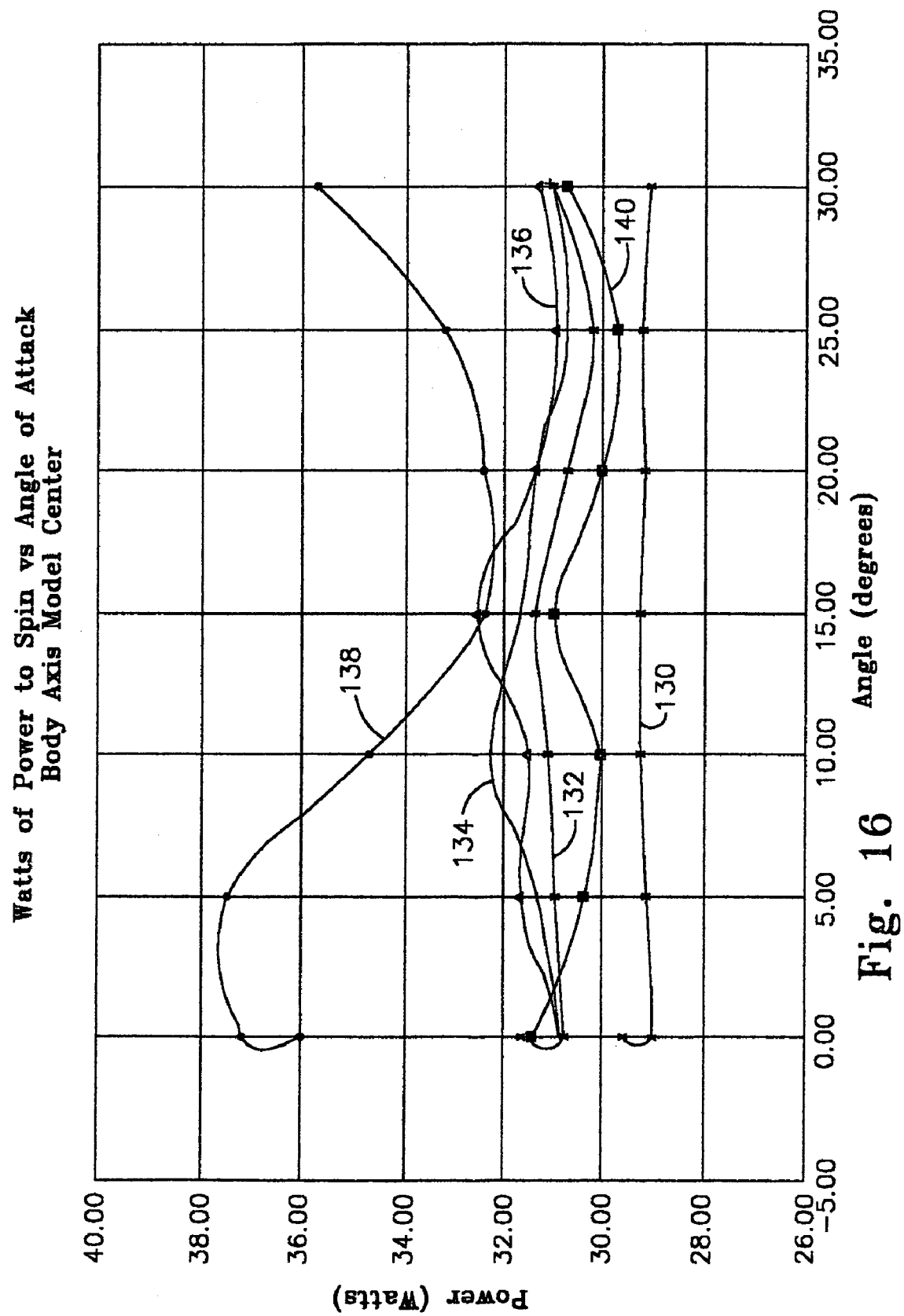
FIG. 16 is a graph showing Watts of power required to spin a wheel of the present invention and several different types of wheel types versus angle of attack.

FIGS. 10–12 are illustrative of various radially extending surface features. FIGS. 10–12 are illustrative of the shape of some alternative surface features for easier viewing, however in practice the surface features would be smaller, more numerous, and more tightly packed. FIG. 10 shows generally linear and smooth radially extending surface features 60 on air engaging surface 20 which extend the majority of the distance between the central hub 12 to the tire engaging portion 34. FIG. 11 shows the radially extending surface features 60 interspersed with shorter radially extending surface features 62 located on the radially outer portion of air engaging surface 20 nearer the tire engaging portion 34. FIG. 12 shows generally zig-zag or lightening-bolt shaped, radially extending surface features 66 on air engaging surface 20 which extend the majority of the distance between the central hub 12 to the tire engaging portion 34. In addition, convex surface features which protrude relative to the major plane of the air engaging surfaces 20, 22 can be used.

When determining the shape of the particular surface features utilized, aerodynamic principles should be employed to maximize the aerodynamic impact of the surface features on the wheel 10. Your attention is now directed to FIGS. 11 and 12, where the aerodynamic aspects of the invention will be discussed.

Turning first to FIG. 12, the aerodynamic principles surrounding a prior art wheel will be discussed. As the bicycle is traveling in the direction indicated generally by arrow WD, the leading edge of the tire 27a mounted on the wheel 10a meets air surrounding the wheel 10a. This air (which may be static in an absolute sense) moves relative to the wheel 10a in a direction indicated generally by arrows AF due to the speed of the bicycle and wheel 10a in the direction WD. The air has different velocities, and thus different pressures, around the moving wheel 10a. The air first hits the crown of the tire 27a creating a relatively high pressure area in front of the crown of the tire 27a, and the air splits around the crown, and flows with increasing velocity and reduced pressurein the direction AF on both sides of the wheel 10a along the air engaging surfaces 20a, 22a. At some separation point, the air separates from the side surfaces 20a, 22a of the wheel 10a and generates a large turbulent flow area starting at the separation point through the trailing edge of the tire 27a, thereby leaving a low pressure wake which results in a suction force behind the trailing edge of the wheel 10a which pulls in the direction DF. The difference between the high pressure at the front of the wheel 10a and the low pressure behind the wheel 10a slows the wheel and the bicycle down. This is the primary source of drag for the bicycle wheel. This effect is similar to the wake left in the water by the movement of a boat, or the wake left in the air by the movement of a golf ball. The combination of high pressure on the leading edge of the wheel 10a, and low pressure DF on the trailing edge of the wheel 10a is a major source of the wheel's aerodynamic drag as it moves through the air. It is believed that the aerodynamic drag due to the low pressure DF at the trailing edge of the wheel is generally greater than the aerodynamic drag due to the high pressure at the leading edge of the wheel.

Turning now to FIG. 11, which schematically illustrates the present invention, the air engaging surfaces 20, 22 of the wheel 10 are covered with a series of surface features 44, such as those shown in FIGS. 1–10. Because the air engaging surfaces 20, 22 are covered with surface features, the thin boundary layer of air next to the air engaging surfaces 20, 22 of the wheel 10 becomes turbulent and energized. Rather than flowing in smooth continuous layers, laminar flow, the air flowing in the direction AF relative to the air engaging surfaces 20, 22 has a microscopic pattern of fluctuations and randomized flow, turbulent flow. Because of this turbulence of the boundary layer, the air flowing in the direction AF can better follow the curvature of the air engaging surfaces 20, 22 and the tire 27.

Thus, the air travels further along the surface feature containing air engaging surfaces 20, 22 of the wheel 10 before separating from the side air engaging surfaces 20, 22, which creates a smaller low pressure wake at the trailing edge of the wheel 10 than at the trailing edge of the wheel 10a which does not have surface features on the air engaging surfaces 20a, 22a. The smaller low pressure wake at the trailing edge of the wheel 10 effectively increases the pressure behind the wheel 10 which results in much less drag DF than the drag created by the relatively larger wake of the non-surface feature containing prior art wheel 10a.

The turbulent boundary layer created by the surface features 44 of the wheel 10 of the present invention remains adhered to the surface of the wheel 10 better than in the smooth surfaced, prior art wheel 10a, and keeps the boundary layer from separating from the air engaging side surfaces 20, 22 longer than the more laminar boundary layer of air that occurs with the prior art, surface feature-less wheel. This also results in less interference drag between the air flowing past the wheel and the bicycle frame members such as the seat stays, chain stays, and the front wheel fork blades.

This reduction in drag allows the wheel 10 to slip through the air with less resistance, which enables the rider to either ride more quickly with the same amount of effort, or alternately to ride at the same speed with less effort, when compared to riding a bicycle with prior art wheels 10a.

The graphs shown in FIGS. 13 and 14 show actual results obtained in wind tunnel tests for a wheel of the present invention versus several different prior art types of wheels. FIG. 11 shows the drag force measured in pounds of drag at a speed of thirty miles per hour versus various angles of attack between the wheel and the wind direction. The line 110, with triangular point markers, shows the drag force measured for the wheel 10 shown in FIGS. 1–7. The line 112, with X-shaped point markers, shows the drag force measured for a prior art wheel having smooth and flat air engaging side surfaces made by Compositech, Inc. The line 114, with asterisk-shaped point markers, shows the drag force measured for another brand of prior art wheel having smooth and flat air engaging side surfaces. The line 116, with plus-sign-shaped point markers, shows the drag force measured for a prior art wheel having convex-shaped air engaging side surfaces. The line 118, with circular-shaped point markers, shows the drag force measured for a prior art wheel having three air foil shaped spokes. The line 120, with square-shaped point markers, shows the drag force measured for a prior art wheel having three air foil shaped spokes and the spaces between the spokes filled by a carbon sheet.

As shown in FIG. 11, the wheel of the present invention shown by the line 110 creates a lower drag force than any of the other wheel types across most of the range of the graph, particularly between angles of 5 and 25 degrees. This can be attributed to lower surface friction on the windward side, and better adhesion of the air flow on the leeward side of the wheel.

FIG. 12 further shows the improvement of a wheel of the present invention over the prior art. FIG. 12 shows the power, measured in watts, required to spin a wheel versus various angles of attack between the wheel and the wind direction. The line 130, with X-shaped point markers, shows the measured power requirement to spin the wheel 10 shown in FIGS. 1–7. The line 132, with asterisk-shaped point markers, shows the measured power requirement to spin the prior art wheel having flat air engaging side surfaces. The line 134, with plus-sign-shaped point markers, shows the measured power requirement to spin the prior art wheel having flat and smooth shaped air engaging side surfaces. The line 136, with triangular-shaped point markers, shows the measured power requirement to spin the prior art wheel having smooth, convex-shaped air engaging side surfaces. The line 138, with circular-shaped point markers, shows the measured power requirement to spin the prior art wheel having three air foil shaped spokes. The line 140, with square-shaped point markers, shows the measured power requirement to spin the prior art wheel having three air foil shaped spokes and the spaces between the spokes filled by a carbon sheet.

FIG. 12 shows several significant features. First, the graph shows how much higher the power requirement is to spin a wheel with three airfoil shaped spokes shown by line 138 versus wheels having solid side surfaces shown by lines 130–136 and 140. An ordinary multi-spoked bicycle wheel would require even greater power to spin. The graph also shows that the wheel of the present invention shown by line 130 requires the least amount of power to spin over the entire range of the graph.

In addition, note how the curves 132–140 in FIG. 12 for the prior art wheels are very non-linear with wind angle. The curves 132–138 for the prior art wheels oscillate in power required, requiring less at certain angles and more at other angles. However, the wheel of the present invention shown by the curve 130 is significantly improved over the prior art in that it not only requires less wattage to spin the wheel, but that it also is very uniform in power required to spin the wheel regardless of the wind direction. Thus, the power required to spin the aerodynamic surface feature containing wheel 10 of the present invention is virtually the same over the range of wind directions relative to the wheel measured in the wind tunnel.

For years it has been believed that a solid sided, disc wheel only works at speeds over 20 miles per hour. But Applicant has seen that the aerodynamic surface features allow the disc to behave optimally at speeds as low as 15 miles per hour, which makes a wheel according to the present invention a more viable option for far more bicycle riders. Additionally, a professional bicycle racer when racing at speeds around 34 miles per hour will not reap as much relative benefit at that speed from the surface feature containing wheel because he has the power to make a smooth wheel go fast enough that it is behaving somewhat optimally as well, however, the professional racer still has to accelerate the wheel up to that speed and deal with the non-linear power characteristics of the wheel in varying wind conditions. Even at the higher speeds of the professional racers, the wheel with surface features still requires less wattage or power to spin as well, so the benefits are reduced but still present Thus, the professional racer as well as the recreational cyclist can benefit from the superior characteristics of the aerodynamic surface featured wheel of the present invention during the acceleration phase, and continue to benefit from the lower power requirements and the linear power characteristics during all phases of riding.

What is claimed is:

1. A human powered vehicle wheel comprising:
   a tire engaging portion located at the outward perimeter of the wheel;
   an inner portion located radially inward from said tire engaging portion;
   a first air engaging side surface extending radially between said inner portion and said tire engaging portion forming a first side of the wheel; and
   a second air engaging side surface extending radially between said inner portion and said tire engaging portion forming a second side of the wheel which is axially opposed to said first side of the wheel;
   wherein said first and second air engaging side surfaces contain a plurality of surface features designed to create a turbulent boundary layer when the wheel travels through air to reduce aerodynamic drag.

2. The human powered vehicle wheel of claim 1, wherein said human powered vehicle wheel comprises at least one of a bicycle wheel and a wheel chair wheel.

3. The human powered vehicle wheel of claim 2, wherein said inner portion is a hub and said hub is separately fabricated from said first and second air engaging side surfaces, and said hub is connected at the center of said first and second air engaging side surfaces.

4. A human powered vehicle wheel comprising:
   a tire engaging portion located at the outward perimeter of the wheel;
   an inner portion located radially inward from said tire engaging portion;
   a first air engaging side surface extending radially between said inner portion and said tire engaging portion forming a first side of the wheel; and
   a second air engaging side surface extending radially between said inner portion and said tire engaging portion forming a second side of the wheel which is axially opposed to said first side of the wheel;
   wherein said first and second air engaging side surfaces contain a plurality of surface features designed to create a turbulent boundary layer when the wheel travels through air to reduce aerodynamic drag and a washer shaped brake engaging portion adjacent to said tire engaging portion.

5. The human powered vehicle wheel of claim 4, wherein said brake engaging portion and said tire engaging portion are separately fabricated from said first and second air engaging side surfaces, and said brake engaging portion and said tire engaging portion are connected at the outward perimeter of said first and second air engaging side surfaces.

6. The human powered vehicle wheel of claim 1, wherein said wheel comprises a wheel composed at least partially of carbon fiber material.

7. The human powered vehicle wheel of claim 4, wherein said plurality of surface features are multi-sided polygonally shaped depressions.

8. The human powered vehicle wheel of claim 7, wherein said multi-sided polygonally shaped surface features are of multiple diameters.

9. The human powered vehicle wheel of claim 8, wherein the diameters of said multi-sided polygonally shaped surface features range from 0.2–0.4 inches.

10. The human powered vehicle wheel of claim 7, wherein said multi-sided polygonally shaped surface features are arranged in a first pattern in a first zone, and a second pattern in a second zone radially outward from said first zone.

11. The human powered vehicle wheel of claim 10, wherein the density of surface features in the second zone is greater than the density of surface features in the first zone.

12. The human powered vehicle wheel of claim 10, wherein the number of surface features in a washer shaped section of a fixed width in the first zone is less than the number of surface features in a washer shaped section of the same fixed width in the second zone.

13. The human powered vehicle wheel of claim 4, wherein said plurality of surface features are radially extending surface features.

14. The human powered vehicle wheel of claim 13, wherein said radially extending surface features have multiple shapes and multiple radial extents.

15. The human powered vehicle wheel of claim 1, wherein said surface features are protrusions from said air engaging side surfaces.

16. The human powered vehicle wheel of claim 1, wherein the wheel is disc shaped.

17. The human powered vehicle wheel of claim 1, further comprising a valve stem receiving aperture.

18. The human powered vehicle wheel of claim 1, wherein said plurality of surface features are designed such that when said wheel moves through a body of air, the boundary layer separates from said first and second air engaging side surfaces closer to the trailing edge of the wheel than the boundary layer would separate from a wheel without surface features.

19. The human powered vehicle wheel of claim 1, wherein said plurality of surface features are circular shaped depressions.

20. A human powered vehicle wheel comprising:
a hub located at the center of the wheel;
a tire engaging portion located at the outward perimeter of the wheel;
a first air engaging side surface extending radially between said hub and said tire engaging portion forming a first side of the wheel having a brake engaging portion adjacent to the tire engaging portion; and
a second air engaging side surface extending radially between said hub and said tire engaging portion forming a second side of the wheel which is axially opposed to said first side of the wheel having a brake engaging portion adjacent to the tire engaging portion;
wherein said first and second air engaging side surfaces contain a plurality of surface features designed such that when said wheel moves through body of air, the boundary layer separates from said first and second air engaging side surfaces closer to the trailing edge of the wheel than the boundary layer would separate from a wheel without surface features.

21. A human powered vehicle wheel comprising:
a tire engaging portion located at the outward perimeter of the wheel;
an inner portion located radially inward from said tire engaging portion;
a first air engaging side surface extending radially between said inner portion and said tire engaging portion forming a first side of the wheel; and
a second air engaging side surface extending radially between said inner portion and said tire engaging portion forming a second side of the wheel which is axially opposed to said first side of the wheel;
wherein said first and second air engaging side surfaces contain a plurality of surface features having closed plane figure profiles designed to create a turbulent boundary layer when the wheel travels through air to reduce aerodynamic drag.

22. The human powered vehicle wheel of claim 21, wherein said plurality of surface features are circular shaped depressions having a depth of between about 0.2 and 0.4 inches.

23. The human powered vehicle wheel of claim 21 wherein said plurality of surface features are polygonally-shaped depressions.

* * * * *